Nov. 4, 1969 G. A. R. SCHROEDER ET AL 3,476,437
TOP FOR MOTOR VEHICLES, ESPECIALLY FOR
PASSENGER MOTOR VEHICLES
Filed July 18, 1966 3 Sheets-Sheet 1

INVENTORS:
Gerhard Albert Richard SCHRÖDER
Werner TRENKLER
Hans TOMALA

BY
ATTORNEYS

Nov. 4, 1969    G. A. R. SCHROEDER ET AL    3,476,437
TOP FOR MOTOR VEHICLES, ESPECIALLY FOR
PASSENGER MOTOR VEHICLES
Filed July 18, 1966    3 Sheets-Sheet 2

INVENTORS:
Gerhard Albert Richard SCHRÖDER
Werner TRENKLER
Hans TOMALA

BY Dicke & Craig
ATTORNEYS

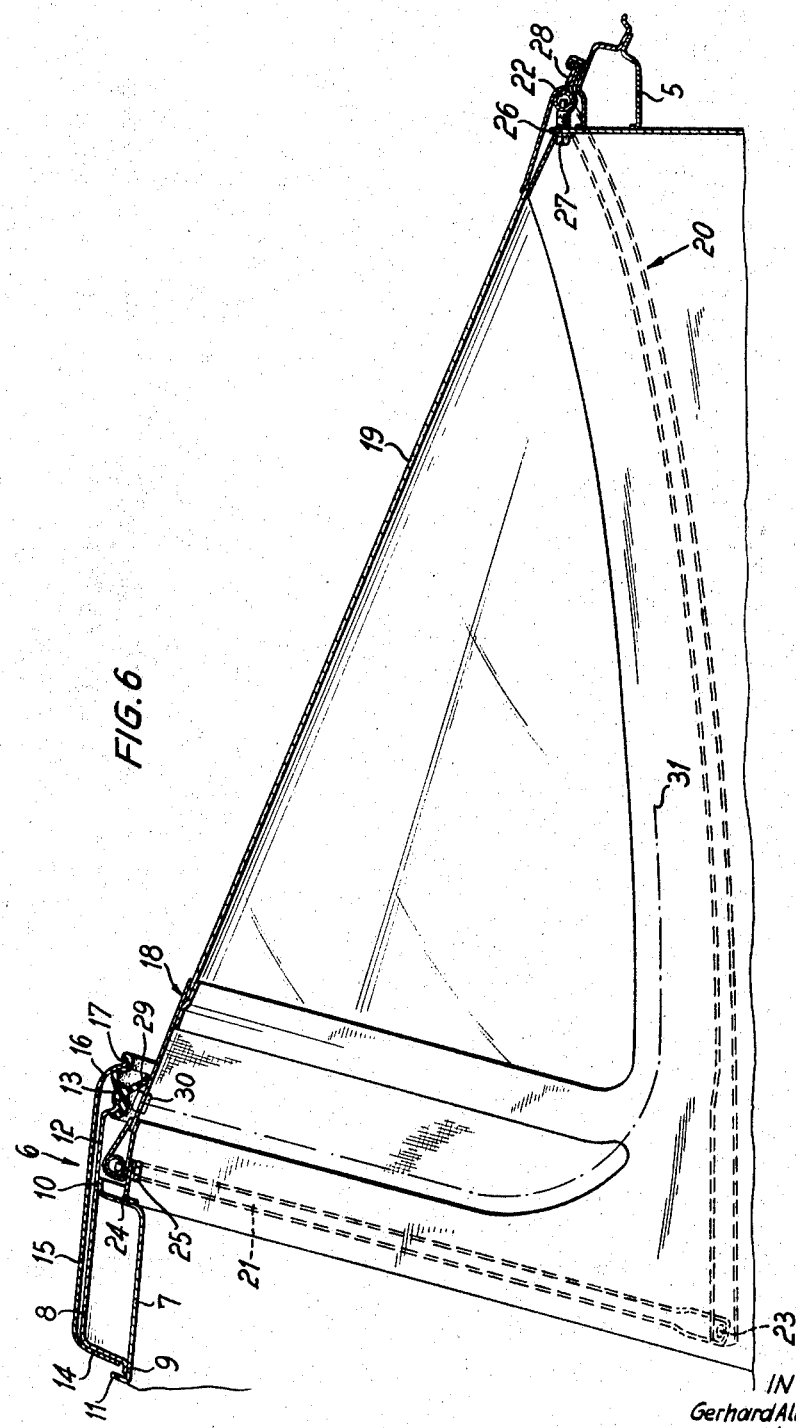

3,476,437
TOP FOR MOTOR VEHICLES, ESPECIALLY FOR PASSENGER MOTOR VEHICLES
Gerhard Albert Richard Schroeder, Ditzingen, Werner Trenkler, Asperg, and Hans Tomala, Stuttgart, Germany, assignors to Firma Dr. Ing. h.c.F. Porsche KG, Stuttgart, Germany
Filed July 18, 1966, Ser. No. 565,840
Claims priority, application Germany, Aug. 11, 1965, P 37,433
Int. Cl. B60j 7/00; B62d 25/06
U.S. Cl. 296—137                     23 Claims

ABSTRACT OF THE DISCLOSURE

A top structure for a passenger motor vehicle, consisting of several sections, one of which constitutes a roll bar extending transversely over the passenger space. Releasably attached to the roll bar and extending therefrom forward to the windshield is a passenger space cover preferably constructed of a pliable material with rigid reinforcement. Also attached to the roll bar and extending therefrom rearward to the super structure of the rear body of the motor vehicle is a rear cover, preferably constructed of a reinforced pliable material and incorporating therein a zipper adapting a portion of the rear cover to be lowered into the motor vehicle.

---

The present invention relates to a top for motor vehicles, especially for passenger motor vehicles, which consists of several sections, of which one is constructed as roll bar extending transversely over the passenger space, on which are secured a passenger space covering and a rear cover.

It is already known in the prior art to construct the top or the covering for the passenger space of a motor vehicle of several sections which are detachably connected with each other and can be accommodated or stored within the vehicle. These parts of the prior art construction are rigid and stiff so that the accommodation and storing thereof, particularly by reason of their large space requirements, is extremely difficult. Furthermore, none of these top sections is so constructed that it could take over the function of a roll bar extending over the passenger space for safety reasons of the passengers.

It is furthermore known in the prior art to construct a portion of the top as roll bar which serves as bearer or girder for adjoining top sections. In this prior art construction, the passenger space covering extending between windshield and the roll bar is constructed as rigid roof and the top section forming the rear cover consists of fabric and is secured directly at the roll bar and at the rear body structure. It is difficult to accommodate or store the rigid roof portion and the latter, if it is accommodated within the vehicle, occupies essentially the entire luggage space so that additionally no larger luggage pieces can be accommodated. A good sealing of the gap between the top and vehicle superstructure is not possible by reason of the direct securing of the top fabric of the rear cover at the fixed superstructure parts. Furthermore, only an insufficient stretching and tensioning of the top can be achieved thereby. This becomes unpleasantly noticeable in particular during high driving velocities of the vehicle by a fluttering of the top and may lead to the loosening of the securing means.

The aim underlying the present invention essentially consists in creating a multi-partite top for motor vehicles comprising a roll bar or girder, in which the gaps between the individual parts or sections are sealed sufficiently and adequately, whose parts or sections can be readily accommodated and stored within the vehicle, and which assures a sufficient form-rigidity also at high velocities of the vehicle.

This is achieved according to the present invention in that the passenger space covering and the rear cover consist of a readily pliable and supple material, for example, plastic leather or the like, in combination with form-rigid reinforcements. The manufacture of the detachable part or parts of the top of soft material, especially of conventional synthetic plastic material, permits within certain limits an arbitrary folding together of these parts, possibly by rolling the same together so that they not only can be readily accommodated and stored within the vehicle but are also adapted to be folded together to an appropriate size or, by a tight rolling together, to the smallest possible size.

The reinforcements impart to the top sections the necessary form-rigidity whereby the disadvantageous fluttering is far-reachingly avoided and simultaneously therewith the prerequisites are created for a good sealing of the gap between the top sections of fabric and the rigid superstructure parts of the vehicle. The reinforcements are constituted by frame-or clamping parts which extend along the edges of the passenger space covering and of the rear cover and serve for the securing thereof at fixed parts of the superstructure of the vehicle.

The reinforcements of the passenger space covering include two lateral profiled or sectional bodies extending in the longitudinal direction of the vehicle and several bars distributed over the width of the covering. A good stiffening of the covering with simultaneous sufficient foldability is achieved thereby. For that purpose the bars are connected with each other and with the profiled or sectional bodies by pliable but not stretchable bands or the like. The profiled or sectional bodies consist in an advantageous manner of light metal castings whereby an inexpensive, stable and yet lightweight construction is obtained. Locking members for the disengageable or detachable connection of the passenger space covering with the adjoining fixed parts of the superstructure of the motor vehicle are provided at the profiled or sectional bodies.

The rear covering consisting of fabric, plastic leather or the like and containing a window pane is provided around the rims thereof with an enclosed frame which is detachably secured at the roll bar and at the rear superstructure of the vehicle. In order to facilitate the connection of the frame with the rear covering, the frame is composed of several frame sections detachably connected with each other. The rear covering is separable by means of a zipper connection which extends along the roll bar and the lateral walls of the superstructure.

Accordingly, it is an object o fthe present invention to provide a top for motor vehicles which avoids, by simple means, the aforementioned drawbacks and shortcomings encountered with the prior art constructions.

It is another object of the present invention to provide a top for passenger motor vehicles consisting of several parts adapted to be detachably connected with each other, which can be readily installed and disassembled, yet permits simple storing thereof within the vehicle without excessive space requirments.

Another object of the present invention resides in a top for passenger motor vehicles consisting of several individual sections which greatly enhances the safety of the passengers yet affords great versatility in the use of the top.

A further object of the present invention resides in a top for passenger motor vehicles consisting of several, individual sections adapted to be connected with each other which is so constructed and arranged as to be easily installed without danger at high speeds of fluttering and/or loosening of the connections of the respective top sections.

Still another object of the present invention resides in a cover for the top of a passenger motor vehicle which can be readily disassembled and stored within the luggage compartment of the vehicle without curtailing the usability of the latter for the accommodation of large luggage pieces.

A still further object of the present invention resides in a top cover for passenger motor vehicles consisting of several sections and adapted to be detachably connected with each other which assures a reliable and tight sealing between the various adjoining parts of the top and the vehicle body notwithstanding the simplicity of its construction.

These and further objects, features and advantages of the present invention will become more obvious from the following description when taken in connection with the accompanying drawing which shows, for purposes of illustration only, one embodiment in accordance with the present invention, and wherein:

FIGURE 6 is a vertical center longitudinal cross-sectional view through the part of the top forming the rear covering together with the adjacent parts of the fixed superstructure parts of the motor vehicle.

The term "superstructure" is used herein to refer to relatively fixed parts of the vehicle structure such as body or frame parts, particularly of a self-supporting-type body construction.

Figure 1:
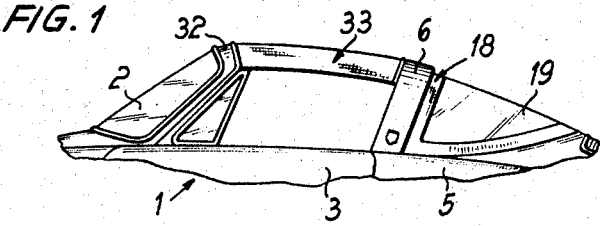
FIGURE 1 is a side elevational view of a top according to the present invention of a passenger motor vehicle together with the adjoining parts of the superstructure of the motor vehicle.

Referring now to the drawing wherein like reference numerals are used throughout the various views to designate like parts, and more particularly to FIGURE 1, reference numeral 1 generally designates therein a motor vehicle which includes within the area illustrated in FIGURE 1 a windshield 2, doors 3 and 4 (the latter not visible in this figure) and a rear superstructure 5, i.e. a rear body section. A roll bar or girder 6 is rigidly connected in any conventional manner with the rear superstructure 5 and extends transversely over the passenger space of the motor vehicle.

The roll bar generally designated by reference numeral 6 (FIGURE 6) is constructed as box-shaped hollow bearer and is composed of stamped-out or pressed-out sheet metal parts 7 and 8 which are connected with each other by spot welding at 9 and 10. The stamping 7 extends beyond the connecting place 9 and forms a channel 11 while the stamping 8 is extended beyond the connecting place 10 whereby the projecting rim portion 12 carries a sectional sealing strip 13. A covering or decorative part 15 is secured at the stamping part 8 at 14 which is made, for example, of stainless steel whose rim 16 is connected with one lip 17 of the sectional strip 13.

A rear covering generally designated by reference numeral 18 extends between the roll bar 6 and the rear superstructure 5 of the motor vehicle; the rear covering 18 consists of a readily pliable and supple material, for example, fabric, synthetic plastic leather or the like. A window 19 is inserted into the rear covering 18 which is preferably made of a conventional transparent plastic material and is connected with the fabric of the rear covering 18 by bonding, gluing or the like. The rims of the rear covering 18 are bound or hemmed-in in a seam-like manner and are provided with a tubularly shaped frame generally designated by reference numeral 20. The frame 20 of the illustrated embodiment is composed of two parts 21 and 22 which are detachably connected with each other at 23. Additionally, the frame part 22 may be composed of several sections (not illustrated in the drawing). The frame 20 serves for the tightening or tensioning of the rear covering 18 and for the securing thereof at the rear superstructure 5 and at the roll bar 6. For that purpose, several sheet metal angle irons 24 are provided at the stamping 7 of the roll bar 6 to which is secured the frame part 21 by means of screws or bolts 25. The rear superstructure 5 of the vehicle body is provided with flanges 26 or the like on which are supported several screws or bolts 27 holding the frame part 22. The rear covering 18 is provided in the rim extending adjacent the rear superstructure 5 with a sealing strip 28 which closes off the gap between the rear covering 18 and the rear superstructure 5. A lip 29 of the sectional strip 13 effects within the area of the roll bar 6 a sealing of the gap leading into the passenger space.

Within the area of the roll bar 6 a zipper 30 is provided in the fabric of the rear covering 18 which extends underneath the roll bar 6 essentially over the entire length thereof and further also along the rear superstructure 5 and reaches up to the point 31. By opening the zipper a considerable part of the rear covering 18 may be lowered into the passenger space.

Figure 2:
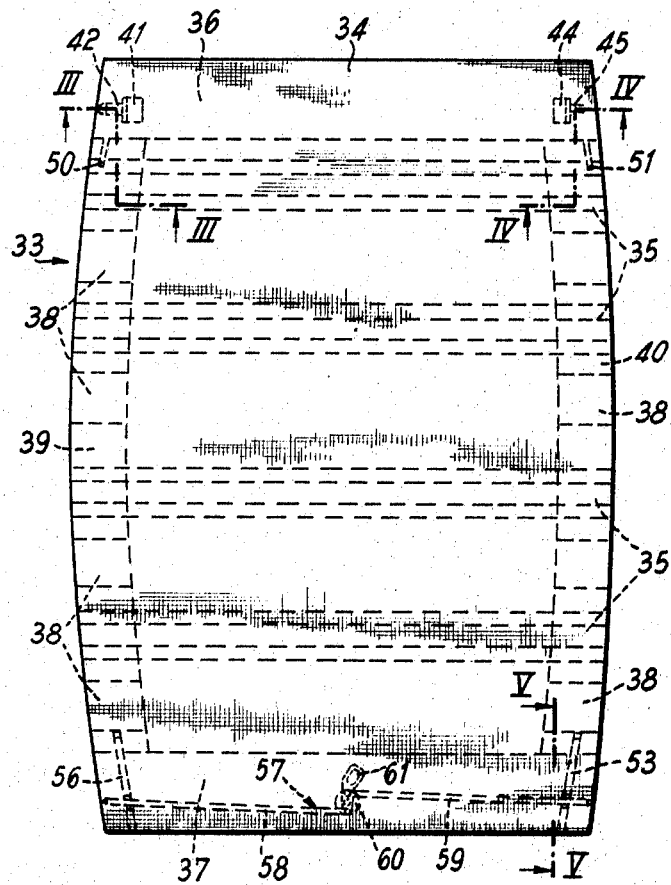
FIGURE 2 is a plan view on the section of the top extending over the passenger space.

A passenger space covering generally designated by reference numeral 33 is detachably inserted between the roll bar 6 and the frame 32 for the windshield 2 of the motor vehicle. The passenger space covering 33 extends in the transverse direction (FIGURE 2) between the two doors 3 and 4 of the motor vehicle. The cover material 34 of the covering 33 consists, for example, of plastic leather and several bars 35 or the like are arranged below the covering material 34. The bars 35 extend in the longitudinal direction of the motor vehicle 33 and are evenly distributed in the transverse direction with a spacing from one another over the width of the covering. The covering 33 is provided adjoining the doors 3 and 4 of the vehicle with profiled or sectional bodies 36 and 37 which are made of light-metal castings. Short lamellae 38 extending only within the edge area of the cover 33 are arranged in the intermediate spaces between the bars 35 and between a bar 35 and a respective one of the profiled bodies. Bands 39 and 40 extend along the transverse edges of the covering 33 which have a width corresponding to that of the lamellae 38 and which surround the lamellae 38 as well as the bars 35 from above and from below in a seam-like manner. The bands 39 and 40 are sewn together or glued together between the lamellae 38 or bars 35 so that pockets result within which are disposed and retained these parts. The ends of the bands 39 and 40 are secured at the profiled or sectional bodies 36 and 37 in any conventional manner. Layers of foam rubber or the like are provided above and below the reinforcements 35, 38 and 36, 37 which are not illustrated in the drawing for reasons of clarity. The underside of the covering 33 may be provided advantageously with a further cover layer of any suitable material.

Figure 3:
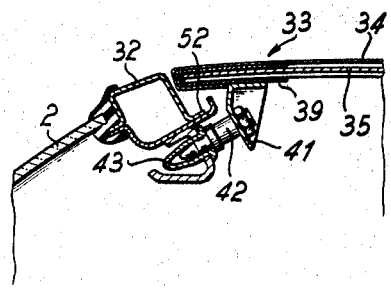
FIGURE 3 is a partial cross-sectional view, on an enlarged scale, taken along line III—III of FIGURE 2.
Figure 4:
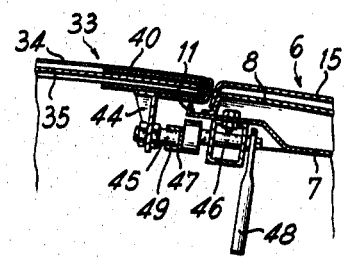
FIGURE 4 is a partial cross-sectional view, on an enlarged scale, taken along line IV—IV of FIGURE 2.

A bracket 41 (FIGURE 3) is secured at the sectional body 36, to which is connected a pin 42 which engages into a sleeve 43 accommodated at the windshield frame 32. Furthermore, a bracket 44 having a bolt 45 (FIGURE 4) is pivotally connected at the sectional profiled body 36. The bolt 45 cooperates with a sleeve 47 secured eccentrically at a shaft 46. The shaft 46 can be actuated by means of a handle 48. The eccentric closure mechanism is illustrated in FIGURE 4 in the closed position. For purposes of disengaging the connection between the bolt 45 and the sleeve 47, the latter has to be brought into such a position by pivoting the handle 48 that the bolt 45 can be guided out through a slot 49 in the sleeve 47.

Two extensions 50 and 51 are provided at the profiled or sectional body 36 which are supported with an installed covering 33 in the channel 11 of the roll bar 6 and in a channel 52 of the windshield frame 32. For purposes of supporting the extensions 50 and 51, however, separate supports or abutments may be provided at the roll bar 6 or at the windshield frame 32. The sectional or profiled body 36 is thus fixed by the pins 42 and 45 and is secured against rotation by the extensions 50 and 51.

Figure 5:
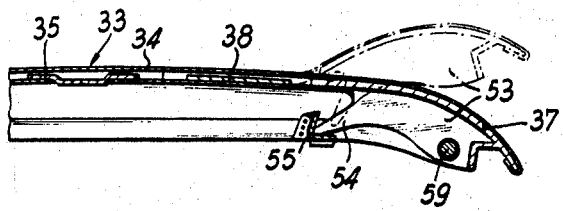
FIGURE 5 is a partial cross-sectional view, on an enlarged scale, taken along line V—V of FIGURE 2.

The profiled or sectional body 37 is provided according to FIGURE 5 with a web 53 that possesses a finger-like extension 54. Extension 54 engages into a V-shaped abutment 55 which is secured at the channel 11 of the stamping 7 of the roll bar 6.

A further web 56 is arranged at the sectional body 37, opposite the web 53, which is constructed and supported in a similar manner as web 53. The sectional body 37 further carries a locking mechanism generally designated by reference numeral 57 which includes locking rods 58 and 59. The locking rods 58 and 59 are secured at a plate 60 which is adapted to be pivoted by means of a lever 61. Upon actuation of the plate 60 by lever 61, the rods 58 and 59 are displaced from the loose or disengaged position thereof as illustrated in the drawing, toward the outside and thereby engage, with the covering installed, sleeves, not illustrated in the drawing for the sake of clarity and provided at the roll bar 6 and at the windshield frame 32, respectively.

During assembly or emplacement of the covering 33, at first the profiled or sectional body 36 is fixed and secured against rotation in the manner described above. Subsequently thereto, the fabric roof is spread, the nose portions of the webs 53 and 56 of the profiled or sectional body 37 are inserted into the abutments 55 as indicated in dash-and-dot lines in FIGURE 5 for the web 53 and the sectional body 37 is pivoted to such an extent that the locking rods 58 and 59 can be engaged into the aforementioned sleeves (not shown). The cover material of the covering is thereby simultaneously stretched out and the covering is pressed against conventional seals provided in channels 11 and 52 and not illustrated in the drawing since they can be of any conventional construction.

While we have shown and described one embodiment in accordance with the present invention, it is understood that the same is not limited thereto but is susceptible of numerous changes and modifications as known to a person skilled in the art. The reinforcements, frames and tensioning parts may also have different shapes and sizes from those illustrated and described. The bands 39 and 40 may be replaced by hinged spreader bars or the like. Additionally, any suitable and appropriate material may be used for the various covering materials of the top sections. Thus, it is obvious that the present invention is not limited to the details shown and described herein but is susceptible of numerous modifications and changes and we therefore do not wish to be limited to the details shown and described herein but intend to cover all such changes and modifications as are encompassed by the scope of the appended claims.

We claim:

1. A top for motor vehicles, especially for passenger motor vehicles, consisting of several interconnected sections including roll bar means spanning the passenger space, passenger space cover means and rear cover means, said passenger space cover means and said rear cover means essentially consisting of easily pliable material in conjunction with form-rigid reinforcing means for said cover material, at least said passenger space cover being adapted to be detached, wherein said roll bar means provides structural support for at least said passenger space cover means and said rear cover means.

2. A top according to claim 1, wherein said passenger space and rear cover means essentially consists of synthetic leather.

3. A top according to claim 10, wherein said reinforcing means include frame means extending principally along the rims of the respective cover means.

4. A top for motor vehicles having a relatively fixed superstructure according to claim 3, wherein said frame means serve for securing said covering means at parts of said superstructure.

5. A top according to claim 4, wherein the reinforcing means of the passenger space cover means includes two lateral sectional bodies extending in the longitudinal direction of the vehicle and several bar means distributed over the width thereof.

6. A top according to claim 5, further comprising supple but non-stretchable band means for connecting said bar means with each other and with said sectional bodies.

7. A top according to claim 6, wherein said sectional bodies consist of light metal castings.

8. A top according to claim 7, further comprising locking means at the sectional bodies for the detachable connection of the passenger space cover means with the adjacent fixed parts of the vehicle superstructure.

9. A top according to claim 4, wherein said rear cover means contains a window pane and is provided circumferentially thereof along the rims with closed frame means secured at said roll bar means and at the rear portion of the vehicle superstructure.

10. A top according to claim 1, wherein said rear cover means consists of fabric.

11. A top according to claim 9, wherein said rear cover means consists of synthetic leather.

12. A top according to claim 9, wherein said closed frame means is composed of several frame sections detachably connected with each other.

13. A top according to claim 12, further comprising zipper means for rendering said rear cover means divisible, said zipper means extending along said roll bar means and along the lateral walls of the rear portion of the superstructure of the vehicle.

14. A top according to claim 9, further comprising zipper means for rendering said rear cover means divisible, said zipper means extending along said roll bar means and along the lateral walls of the rear portion of the superstructure of the vehicle.

15. A top according to claim 5, wherein said sectional bodies consist of light metal castings.

16. A top according to claim 15, further comprising locking means at the sectional bodies for the detachable connection of the passenger space cover means with the adjacent fixed parts of the vehicle superstructure.

17. A top according to claim 1, wherein the reinforcing means of the passenger space cover means includes two lateral sectional bodies extending in the longitudinal direction of the vehicle and several bar means distributed over the width thereof.

18. A top according to claim 17, further comprising supple but non-stretchable band means for connecting said bar means with each other and with said sectional bodies.

19. A top according to claim 17, wherein said sectional bodies consist of light metal castings.

20. A top according to claim 19, further comprising locking means at the sectional bodies for the detachable connection of the passenger space cover means with the adjacent fixed parts of the vehicle superstructure.

21. A top according to claim 1, wherein said rear cover means contains a window pane and is provided circumferentially thereof along the rims with closed frame means secured at said roll bar means and at the rear portion of the vehicle superstructure.

22. A top according to claim 21, wherein said closed frame means is composed of several frame sections detachably connected with each other.

23. A top according to claim 21, further comprising zipper means for rendering said rear cover means divisible, said zipper means extending along said roll bar means and along the lateral walls of the rear portion of the superstructure of the vehicle.

References Cited

UNITED STATES PATENTS

| | | | |
|---|---|---|---|
| D. 177,650 | 10/1955 | Stevens | D14—3 |
| 1,738,060 | 12/1929 | Barnes | 296—137 |
| 3,001,212 | 9/1961 | Towwie | 9—1 |
| 3,028,194 | 4/1962 | Werner | 296—137 |

BENJAMIN HERSH, Primary Examiner

J. SIEGEL, Assistant Examiner

U.S. Cl. X.R.

280—150; 296—107